United States Patent [19]
He

[11] Patent Number: 5,777,338
[45] Date of Patent: Jul. 7, 1998

[54] IONIZATION DETECTOR, ELECTRODE CONFIGURATION AND SINGLE POLARITY CHARGE DETECTION METHOD

[75] Inventor: Zhong He, Ann Arbor, Mich.

[73] Assignee: Regents of the University of Michigan, Ann Arbor, Mich.

[21] Appl. No.: 763,675

[22] Filed: Dec. 11, 1996

[51] Int. Cl.$^6$ .............................. G01T 1/185; G01T 1/24
[52] U.S. Cl. .................................. 250/385.1; 250/370.13
[58] Field of Search ........................... 250/385.1, 370.13

[56] References Cited

U.S. PATENT DOCUMENTS

| | | | |
|---|---|---|---|
| 3,975,638 | 8/1976 | Grunberg et al. | 250/385.1 |
| 4,376,893 | 3/1983 | Whetten | 250/374 |
| 5,530,249 | 6/1996 | Luke | 250/374 |
| 5,627,377 | 5/1997 | Hamilton, Jr. et al. | 250/370.13 |
| 5,677,539 | 10/1997 | Apotovsky et al. | 250/370.13 |

FOREIGN PATENT DOCUMENTS

1481697A1  5/1989  U.S.S.R. ............................. 250/385.1

OTHER PUBLICATIONS

Unipolar Charge Sensing with Coplanar Electrodes–Applications to Semiconductor Detectors, P. N. Luke, IEEE Transactions on Nuclear Science, vol. 42, No. 4, Aug. 1995.
1–D Position Sensitive Single Carrier Semiconductor Detectors (He et al.) UM File No. 1263, Department of Nuclear Engineering.

Single-Polarity Charge Sensing in Ionization Detectors Using Electrodes, Luke, Appl. Phys. Lett. 65 (122), 28 Nov. 1994.

New Gamma–Ray Detector Structures for Electron Only Charge Carrier Collection Utilizing High–Z Compound Semiconductors, B.E. Patt et al. 9th International Workshop, 1995.

Performance of CdZnTe Coplanar-Grid Gamma-Ray Detectors, P.N. Luke et al., 0018-9499/1996 IEEE.

*Primary Examiner*—Constantine Hannaher
*Attorney, Agent, or Firm*—Brooks & Kushman P.C.

[57] ABSTRACT

An ionization detector, an electrode configuration and a single polarity charge detection method each utilize a boundary electrode which symmetrically surrounds first and second central interlaced and symmetrical electrodes. All of the electrodes are held at a voltage potential of a first polarity type. The first central electrode is held at a higher potential than the second central or boundary electrodes. By forming the first and second central electrodes in a substantially interlaced and symmetrical pattern and forming the boundary electrode symmetrically about the first and second central electrodes, signals generated by charge carriers are substantially of equal strength with respect to both of the central electrodes. The only significant difference in measured signal strength occurs when the charge carriers move to within close proximity of the first central electrode and are received at the first central electrode. The measured signals are then subtracted and compared to quantitatively measure the magnitude of the charge.

25 Claims, 5 Drawing Sheets

Coplanar electrodes
(typical strip width: 100um)

IONIZATION DETECTOR, ELECTRODE CONFIGURATION AND SINGLE POLARITY CHARGE DETECTION METHOD

GOVERNMENT RIGHTS

The United States Government has rights in this invention pursuant to Contract No. DE-FG08-94NV11630 from the United States Department of Energy.

TECHNICAL FIELD

The present invention relates to the field of ionization detection and, more specifically, to single polarity charge carrier sensing in ionization detectors.

BACKGROUND ART

Ionization detectors such as radiation detectors which use simple planar electrodes and which are based on ionization measurements often suffer from poor collection of charge carriers of certain polarity types. Such detectors include, for example, semiconductor detectors, liquid ionization detectors, and gas ionization detectors. The poor collection characteristics of these detectors can be due to such factors as intrinsic material properties, defects in the detector medium, or radiation damage.

Semiconductors having high atomic numbers and wide band-gaps, such as $HgI_2$, CdTe and CdZnTe, have long been under development as potential room-temperature γ-detectors. These detectors have high detection efficiency, freedom from cryogenic cooling and potentially achievable excellent energy resolution decided by the small ionization energy needed to generate one electron-hole pair. Although these semiconductors have been successfully employed in various applications, the widespread use of these devices has been hindered by their charge trapping problem which causes incomplete charge collection, and therefore, very poor energy resolution.

Referring now to FIGS. 1 and 2, U.S. Pat. No. 5,530,249 to Luke discloses a semiconductor ionization detector 10 including coplanar electrodes which use parallel strip electrodes 12 and 14 connected in an alternate manner to give two sets of inter-digital grid electrodes. When charges move within the bulk of the detector, they induce the same amount of charge on both electrodes 12 and 14. One of the electrodes 12 and 14 is a collecting electrode which is biased at a higher voltage compared to that of the non-collecting electrode.

In this way, the charge that drifts toward the coplanar electrodes will be collected by only the collecting electrode. An electrical terminal 18 provides a common electrical terminal for the electrodes 14 and an electrical terminal 20 provides a common electrical terminal for the electrodes 12. By reading out a difference signal between these two terminals 18 and 20, the same amount of charges induced by holes moving toward a cathode 16 can be cancelled out.

Therefore, the difference signal from the terminals 18 and 20 is mainly proportional to the number of electrons arriving on the collecting electrode. In other words, by reading the difference signal between these two sets of electrodes, pulses induced by one type (electrons or holes) of charge carriers can be obtained. This method is also called single-polarity charge sensing. For commonly used semiconductor devices, electron trapping is much less severe than that of holes. Good energy resolution can be obtained if signals induced by electrons only can be picked out so that the hole trapping problem can be eliminated resulting in significant improvement in energy resolution.

In order to connect alternative strip electrodes, Luke uses a wire bounding technique which makes the structure very complex and fragile, and therefore, very difficult to commercialize. Furthermore, the coplanar electrode is an intrinsic non-symmetric configuration for limited detector area. This causes unequal amount of charges induced on coplanar electrodes when charges move within the bulk of the detector. This effect degrades the energy resolution, especially when the γ-ray interaction is close to the coplanar electrodes.

Referring to FIG. 5, there is illustrated another prior art ionization detector which, however, needs high precision mounting and is difficult to keep reliable contact (due to different thermal expansion of coefficients of detector and substrate materials and other factors).

SUMMARY OF THE INVENTION

An object of the present invention is to provide an improved ionization detector and electrode configuration and signal polarity charge detection method including first and second central electrodes and a boundary electrode to minimize non-symmetric effects of the first and second central electrodes to thereby improve energy resolution (i.e. measurement accuracy).

Another object of the present invention is to provide an improved ionization detector and electrode configuration including first and second central electrodes and a boundary electrode in a single structure which is not only more rugged and reliable, but is also relatively inexpensive to make using conventional metalization processes.

Still another object of the present invention is to provide an improved ionization detector and electrode configuration including first and second central electrodes and a boundary electrode wherein each electrode is self-connecting so that only three contacts are need to connect the electrodes in a measuring circuit.

Yet still another object of the present invention is to provide an improved ionization detector and electrode configuration and signal polarity detection method including first and second central electrodes wherein electronic noise between the first and second central electrodes is significantly reduced by using a boundary electrode.

In carrying out the above objects and other objects of the present invention, an ionization detector electrode configuration is provided. The electrode configuration includes a first central electrode disposed at a first surface of an ionization substrate. The first central electrode is adapted to receive a first voltage potential of a first polarity type. The first surface is disposed opposing a second surface of the ionization substrate. The second surface has disposed thereat an opposing electrode adapted to receive a voltage potential of a second polarity type. The electrode configuration also includes a second central electrode disposed at the first surface of the ionization substrate. The second central electrode is adapted to receive a second voltage potential of the first polarity type. The first and second central electrodes are positioned at the first surface of the ionization substrate in a substantially interlaced and symmetrical pattern. Finally, the electrode configuration includes a boundary electrode disposed at the first surface of the ionization substrate surrounding the first and second central electrodes. The boundary electrode is adapted to receive a third voltage potential of the first polarity type such that signals generated by at least one charge carrier of the second polarity type moving within the ionization substrate between the first and second surfaces toward the first and second central electrodes and away from the opposing electrode, are of substantially equal strength with respect to both the first and second central electrodes until the at least one charge carrier moves within close proximity of the first and second central electrodes.

Preferably, each of the central electrodes includes parallel conductive strips and a conductive connector strip for commonly connecting its parallel conductive strips.

Also, preferably, the conductive connector strip of each of the central electrodes surrounds the parallel conductive strips of the other central electrode.

Still further in carrying out the above objects and other objects of the present invention, a method is provided for single polarity charge detection. The method includes the steps of positioning a first central electrode at a first surface of an ionization substrate wherein the first surface is disposed opposing a second surface of the ionization substrate, positioning a second central electrode at the first surface of the ionization substrate in a substantially interlaced and symmetrical pattern with the first central electrode, positioning an opposing electrode at the second surface of the ionization substrate, and positioning a boundary electrode at the first surface of the ionization substrate surrounding the first and second central electrodes. Signals generated by at least one charge carrier of a first polarity type moving within the ionization substrate between the first and second surfaces toward the first and second central electrodes and away from the opposing electrode are substantially of equal strength with respect to both of the first and second central electrodes until the at least one charge carrier of the first polarity type moves to within close proximity of the first and second central electrodes. The method further includes the steps of applying a first voltage potential of a second polarity type to the first central electrode, applying a second voltage potential of the second polarity type to the second central electrode, applying a third voltage potential of the second polarity type to the boundary electrode, and applying a voltage potential of the first polarity type to the opposing electrode. Finally, the method includes the step of measuring at both of the first and second central electrodes the signals generated by the at least one charge carrier moving within the ionization substrate between the first and second surfaces.

Preferably, the steps of positioning the first and second central electrodes at the first surface of the ionization detector in a substantially interlaced and symmetrical pattern further include the steps of positioning a plurality of parallel conductive strips and a conductive connector strip for commonly connecting the plurality of parallel conductive strips and arranging the parallel conductive strips of the first central electrode parallel to the parallel conductive strips of the second central electrode and interlacing the parallel conductive strips of the first central electrode with the parallel conductive strips of the second central electrode such that adjacent conductive parallel strips of the first central electrode have a conductive parallel strip of the second central electrode disposed therebetween.

Yet still further in carrying out the above objects and other objects of the present invention, an ionization detector is provided. The ionization detector includes an ionization substrate having a first surface and a second surface opposing the first surface. The detector also includes a first central electrode disposed at the first surface, an opposing electrode disposed at the second surface, and a second central electrode disposed at the first surface in a substantially interlaced and symmetrical pattern with the first central electrode. The ionization detector also includes a boundary electrode disposed at the first surface of the ionization substrate surrounding the first and second central electrodes such that signals generated by at least one charge carrier of a first polarity type moving within the ionization substrate between the first and second surfaces toward the first and second central electrodes and away from the opposing electrode are substantially of equal strength with respect to both of the first and second central electrodes until the at least one charge carrier of the first polarity type moves to within close proximity of the first and second central electrodes. The ionization detector further includes a first voltage potential circuit for applying a first voltage potential of a second polarity type to the first central electrode, a second voltage potential circuit for applying a second voltage potential of the second polarity type to the second central electrode, and a third voltage potential circuit for applying a third voltage potential of the second polarity type to the boundary electrode. The ionization detector still further includes a fourth voltage potential circuit for applying a voltage potential of the first polarity type to the opposing electrode and a signal measurement circuit for measuring at both of the first and second central electrodes signals generated by the at least one charge carrier moving within the ionization substrate between the first and second surfaces.

Preferably, each of the central electrodes includes parallel conductive strips and a conductive connector strip for commonly connecting its parallel conductive strips.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 6:
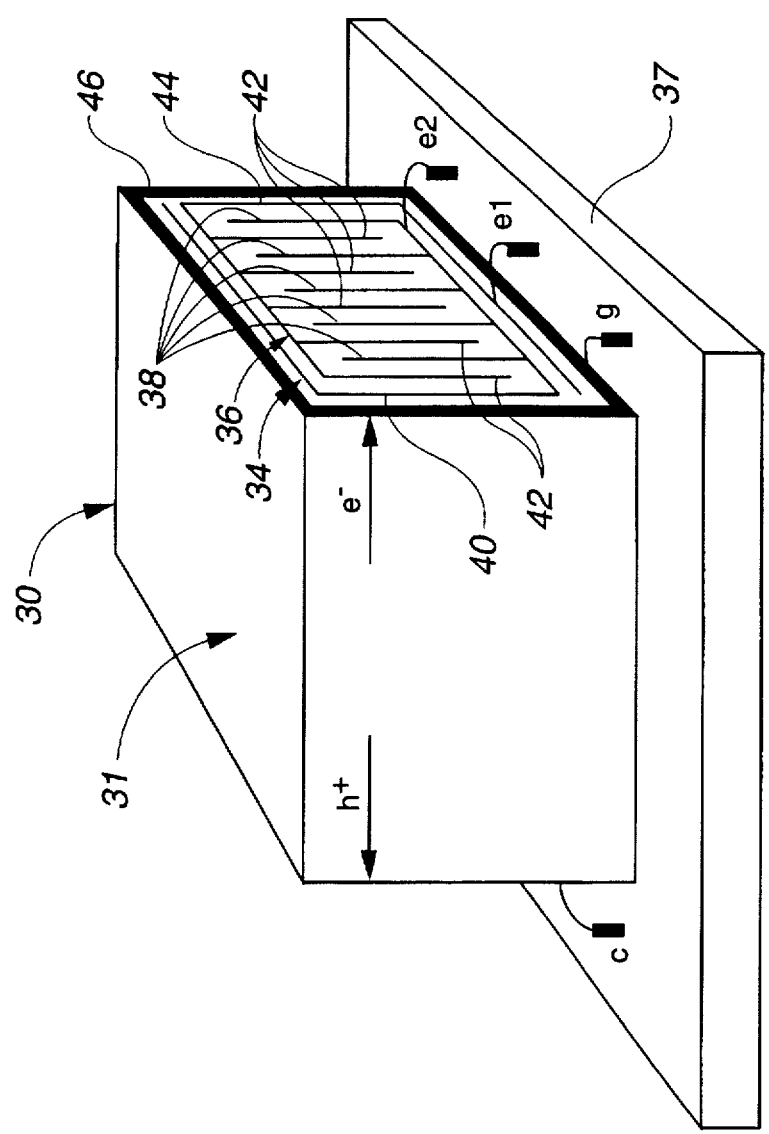
FIG. 6 is a perspective view of a semiconductor ionization detector having a simplified electrode configuration constructed in accordance with the present invention.
Figure 5:
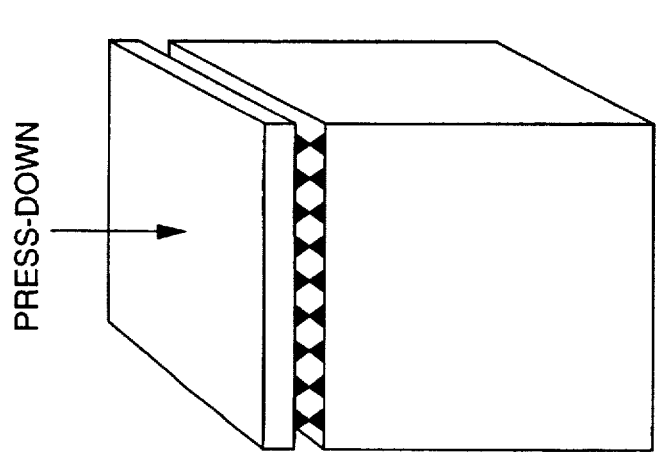
FIG. 5 is a perspective view of another prior art semiconductor ionization detector.
Figure 7:
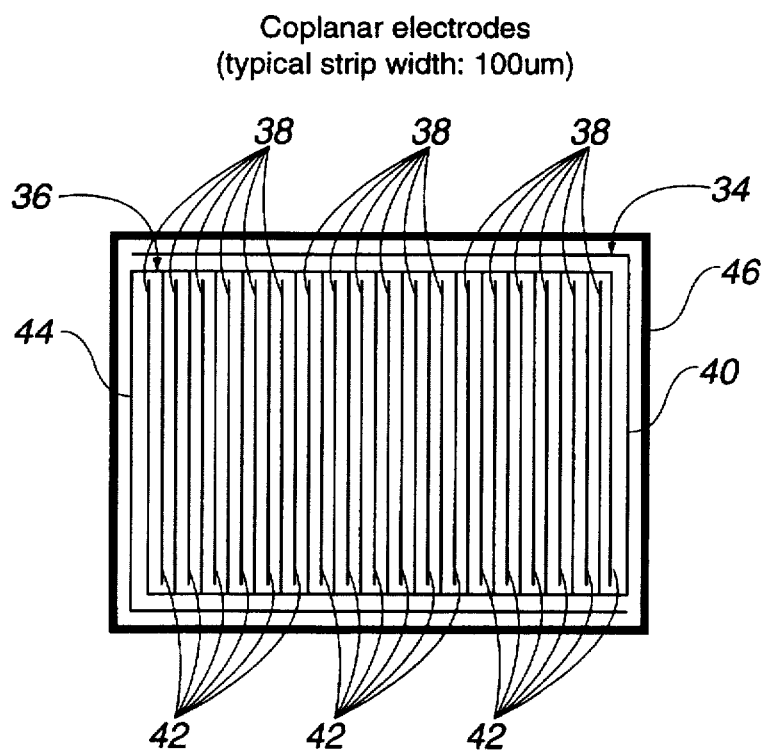
FIG. 7 is an end view of the semiconductor ionization detector of FIG. 6 with a more complicated electrode configuration.
Figure 8:
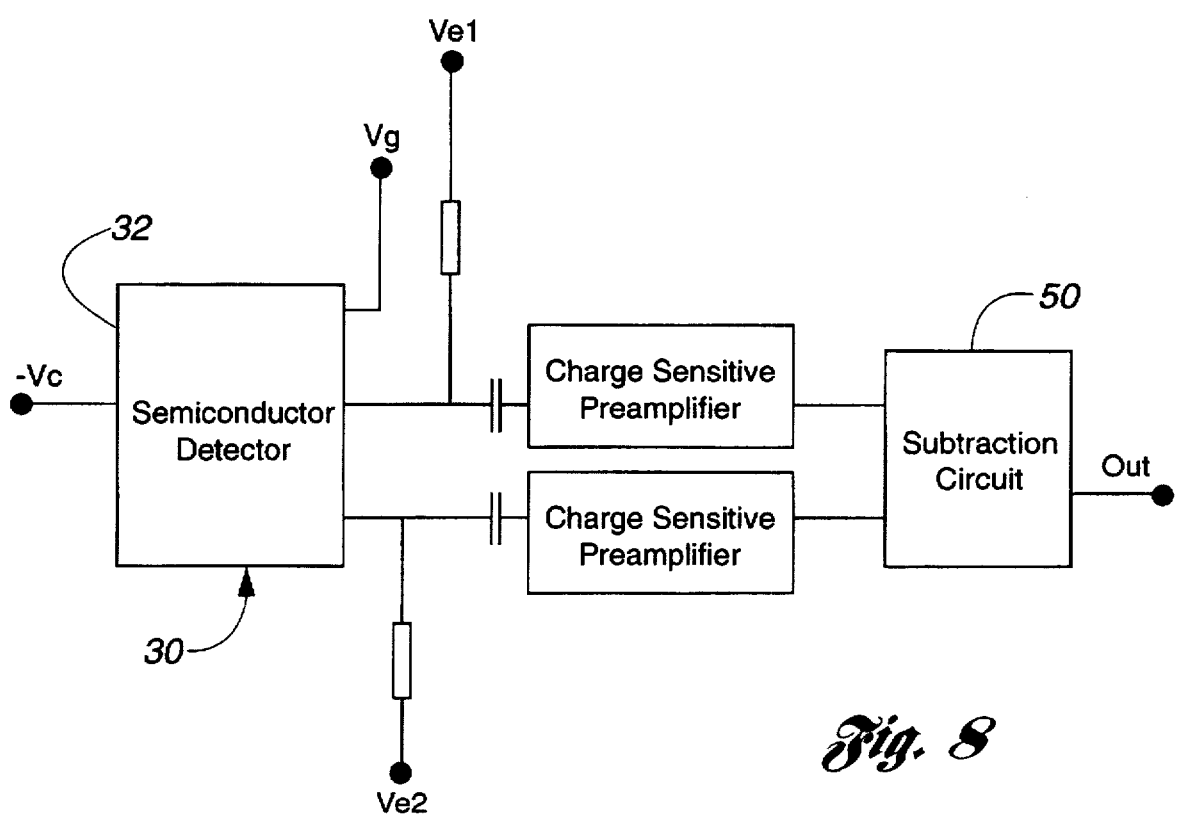
FIG. 8 is a schematic diagram illustrating a typical ionization detector set-up of the present invention.

With reference now to FIGS. 6 through 8, a perspective view of a semiconductor ionization detector having an electrode configuration constructed in accordance with the present invention is generally indicated at 30. In the present embodiment, the detector 30 includes a cube-shaped, cadmium zinc telluride, CdZnTe, semiconductor ionization substrate 31 having a cathode (i.e. electrode 32 in FIG. 8 connected to terminal c in FIG. 6) formed on one side surface of the substrate 31. Two independent central electrodes, generally indicated at 34 and 36, are formed in a substantially symmetric and interlaced arrangement on another side surface of the substrate 31 opposing the cathode. The first central electrode 36 is a collecting electrode and is connected to a terminal e1, located on a base 37. The second central electrode 34 is a non-collect electrode and is connected to a terminal e2 located on the base 37.

The second central electrode 34 includes a plurality of parallel conductive strips 38 and a conductive connector strip 40 for commonly connecting the parallel conductive strips 38.

The first central electrode 36 also includes a plurality of parallel conductive strips 42 and a conductive connector strip 44. A typical width for the strips 38, 40, 42 and 44 is approximately 100 μm. A fewer number of conductive strips 38 and 42 are illustrated in FIG. 6 for the sake of simplicity.

A boundary electrode 46 (connected to terminal g in FIG. 6) completely surrounds the first and second central electrodes 36 and 34 and together with the independent electrodes 34 and 36 function as an anode. Although the electrodes 34, 36 and 46 function as an anode in the present embodiment, the present invention is also well suited to having the electrodes 34, 36 and 46 alternatively function as a cathode and the opposing electrode 32 function as an anode. Also, the boundary electrode 46 need not be continuous but could be segmented.

With reference still to FIG. 6, in the present embodiment, the electrodes 34, 36 and 46 may be formed by any well known semiconductor metalization process such as photolithography and sputtering on a surface of the substrate 31. Thus, an ionization detector utilizing the present invention can be fabricated using existing technologies and without dramatically increasing detector fabrication costs. Furthermore, although the electrode configuration of the present invention is used in a cadmium zinc telluride semiconductor substrate, the present invention is also well suited for use with, for example, other compound semiconductor substrates (such as $HgI_2$, CdTe, Ge, etc.), semiconductor detectors or substrates, solid state detectors or substrates, and even liquid or gaseous ionization detectors. In liquid or gaseous ionization detectors, the interlaced and symmetric central electrodes (i.e. electrodes 34 and 36) and the boundary electrode (i.e. electrode 46) would be positioned at one of the opposing faces of a liquid or gaseous detector.

The present invention uses the novel electrode structure previously described and a signal subtraction technique of FIG. 8 (via the circuit elements shown thereon including a subtraction circuit 50) to obtain signals whose strength and signal amplitude variation is not position dependent. That is, the magnitudes of the measured signals do not vary significantly regardless of where in a plane parallel to the planes containing the anodes and cathode the collected charge carrier is generated within the substrate 31. Furthermore, even when only charge carriers of one polarity type are collected, the position of charge generation within such parallel plane in the substrate 31 does not affect signal strength.

With particular reference now to FIG. 7, an end view of the electrode configuration of the embodiment of FIG. 6 is shown. In the present embodiment, the conductive strips 38 and 42 extend across most of a surface of substrate 31. The gap between the conductive connector strips 40 and 44 and the boundary conductive electrode 46 is preferably as small as possible yet maximize interstrip resistance (i.e., e1–e2, e1–g, e2–g) to be ~$10^9$ ohms or higher. Although a pattern of two, alternating sets of parallel conductive strips of the electrodes 34 and 36 is used in the present embodiment, the present invention is well suited to numerous other symmetrical and interlaced conductive strip configurations.

With particular reference again to FIGS. 6 and 8, a description of the operation of the present invention is now given. For electron detection, voltage potentials V(e1) and V(e2) of positive polarity are applied to respective terminals e1 and e2 for electrodes 36 and 34, respectively. A voltage potential V(g) of positive polarity is also applied to terminal g for the boundary electrode 46. Finally, a voltage potential V(c) of negative polarity is applied to a terminal c for the opposing electrode 32. For electron detection, the following equation governs the relative voltages:

$$V(c) \ll V(g) \leq V(e2) < V(e1)$$

As a result, a relatively uniform electric field is generated inside the semiconductor substrate 31 so that negative charge carriers drift toward the electrodes 34, 36 and 46 and away from the opposing electrode 32. When a negative charge carrier drifts from the opposing electrode 32 toward the electrodes 34, 36 and 46, an increasing charge signal is induced separately on the electrodes 34 and 36. For most of the distance traveled by the negative charge carrier, the signals induced at the electrodes 34 and 36 are almost identical. The two signals will only deviate significantly from each other when the negative charge carrier drifts to within close proximity of the electrodes 34 and 36 when making its final approach to the collecting conducting strips 42. By making the separation of the electrodes 34 and 36 small compared to the thickness of substrate 31, the difference between signals obtained at the electrodes 34 and 36 will be extremely small for almost the entire volume of the substrate 31.

Figure 1:
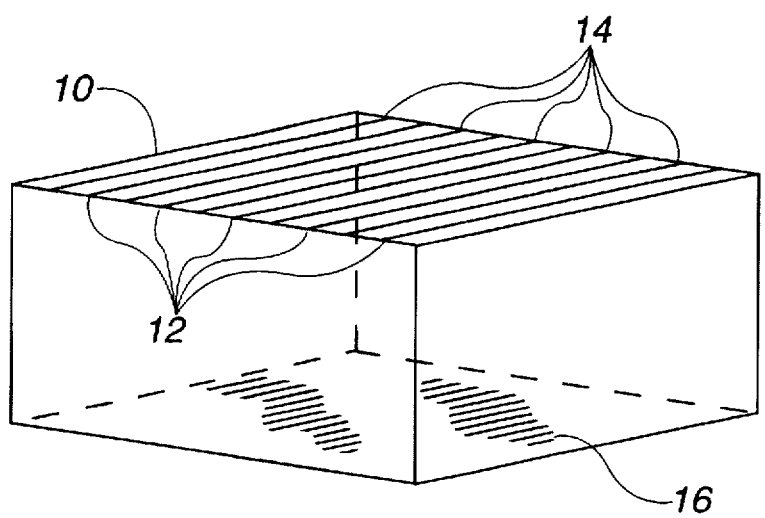
FIG. 1 is a perspective view of a prior art semiconductor ionization detector having a coplanar electrode configuration formed thereon.
Figure 2:
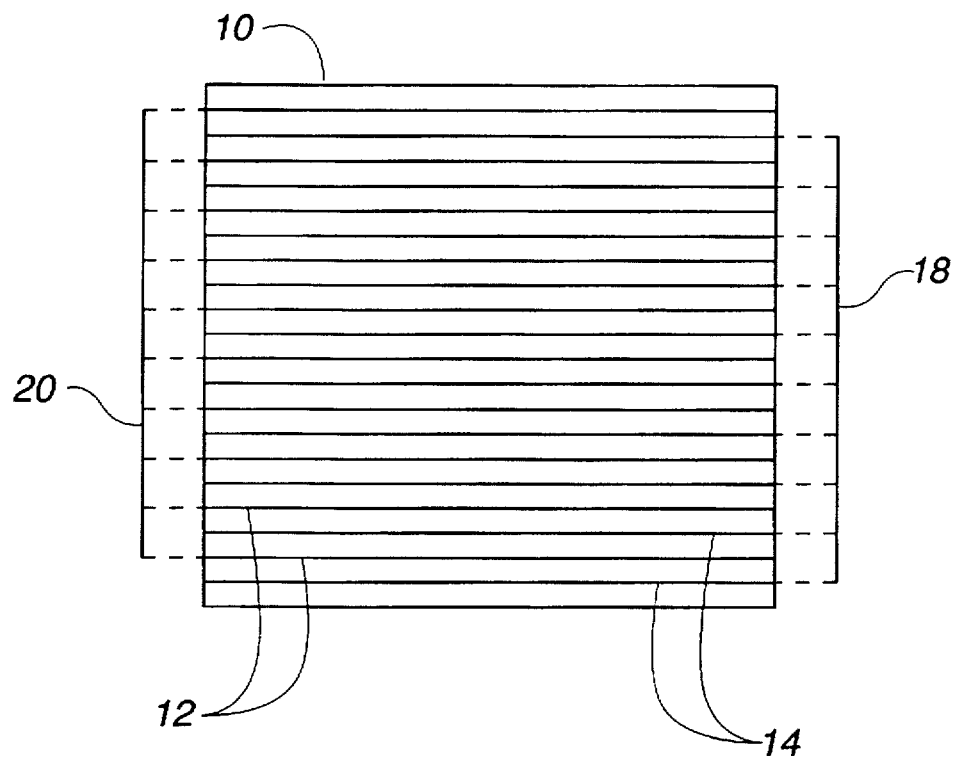
FIG. 2 is a top view of the semiconductor ionization detector of FIG. 1.
Figure 3:
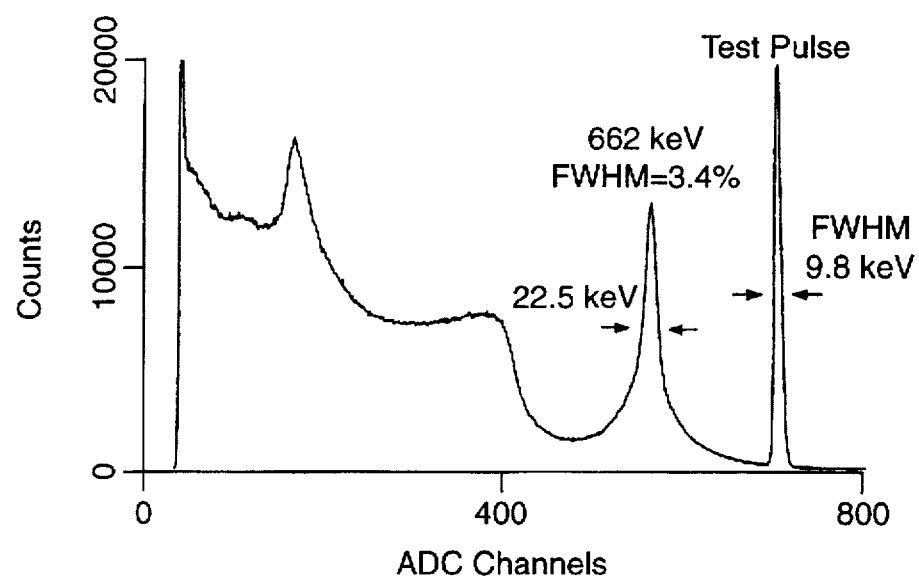
FIG. 3 shows an energy spectrum obtained from exposing a detector having an electrode structure similar to the prior art detector of FIG. 1 (i.e. a 5 mm cube CdZnTe detector) to 662 KeV gamma rays.
Figure 4:
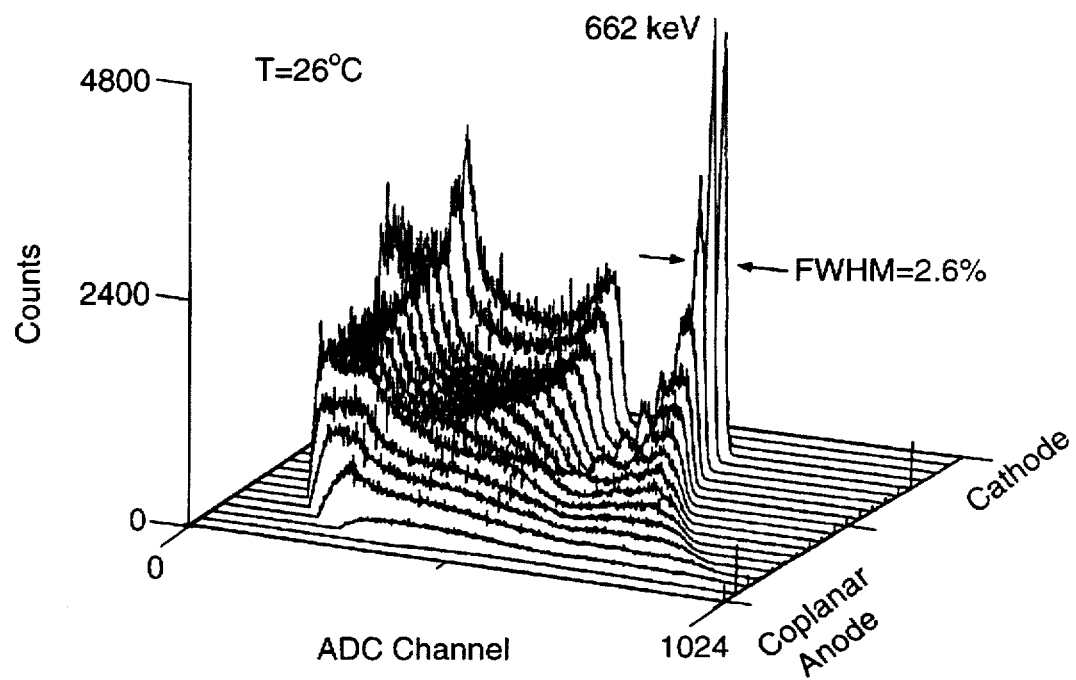
FIG. 4 shows energy spectra versus interaction depth obtained from exposing the detector of FIG. 1 to 662 KeV gamma rays.
Figure 9:
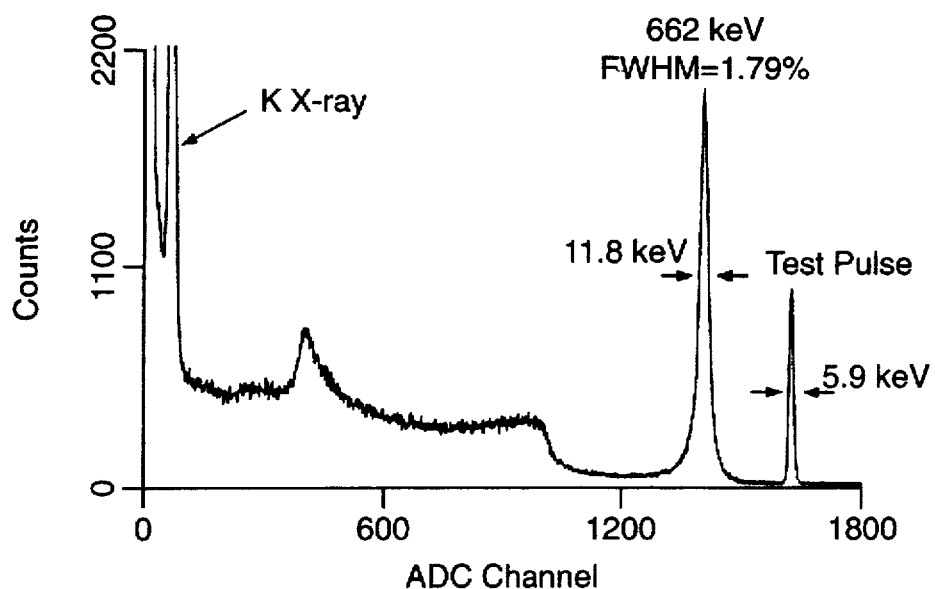
FIG. 9 shows an energy spectrum obtained by exposing the detector of FIG. 6 (i.e. a 1 cm cube CdZnTe detector) to 662 KeV gamma rays.
Figure 10:
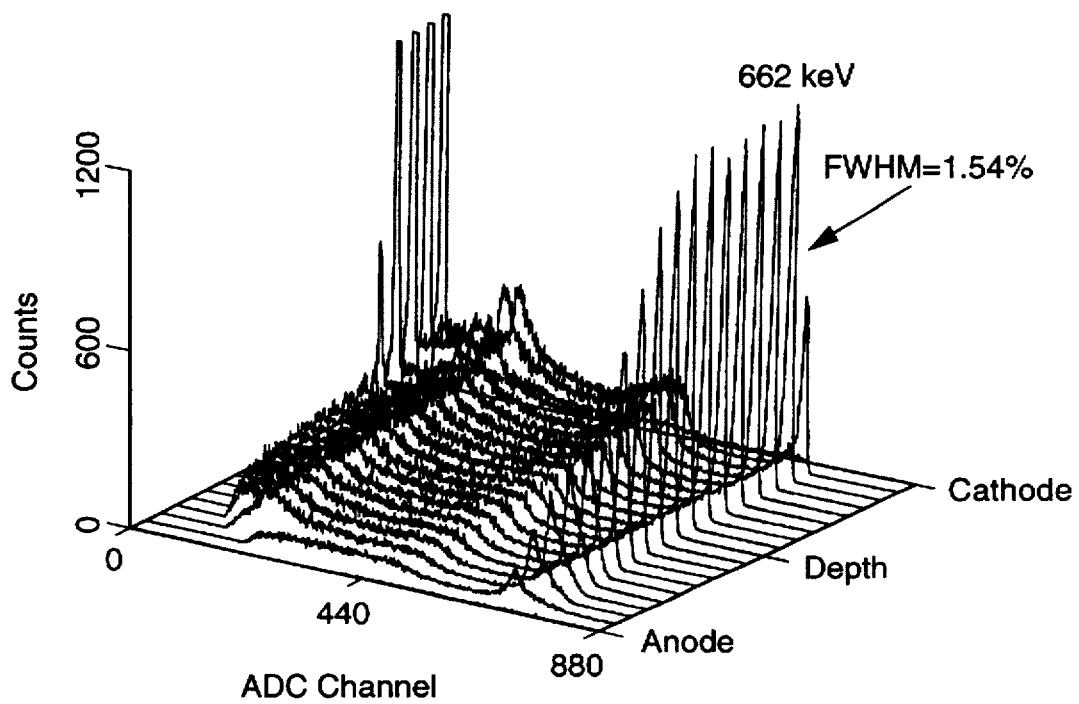
FIG. 10 shows energy spectra versus interaction depth obtained from exposing the detector of FIG. 6 to 662 KeV gamma rays.

With reference next to FIGS. 9 and 10, an energy spectrum graph obtained from exposing the detector 30 to 662 KeV gamma rays from a source of such rays is shown. By comparing the spectrums of FIGS. 3 and 4 (obtained by using the detector having similar electrode structure of that of FIGS. 1 and 2) with their corresponding spectrums of FIGS. 9 and 10, it is clear that the present invention provides substantial improvement in energy resolution over the prior art of FIGS. 1 and 2. Specifically, the detector 30 provides a clear full energy photo peak corresponding to the energy of the gamma rays.

The electrode structure has a unique symmetric pattern for the central coplanar electrodes 34 and 36. By adding the third boundary electrode 46 surrounding the coplanar electrodes 34 and 36, the difference of signals induced by charges moving within the bulk of the substrate 31 is minimized. This insures that the signal amplitude is only proportional to the number of charge carriers arriving at the collecting electrode (i.e. the first central electrode 36).

Significant improvement in energy resolution has been demonstrated on a 1 cm cube CdZnTe detector using the electrodes 34, 36 and 46. More importantly, since each of the electrodes 34, 36 and 46 is self-connecting, only three contacts are needed to connect the electrodes 34, 36 and 46 with the electronic circuit of FIG. 8. This electrode structure is much more rugged and easy to manufacture using standard methods of semiconductor metalization processes, such as photolithography and sputtering.

Several additional benefits are provided by the present invention. By enhancing the performance of ionization detectors, the performance of room temperature semiconductor detectors can be brought even closer to that of cryogenic Ge detectors. In so doing, the need for expensive cooling systems can be eliminated.

As a result of the vastly improved energy resolution, the present invention can have a positive impact in many areas including, for example radioactive waste management, environmental monitoring material analysis, nuclear medicine, nuclear physics, and gamma-ray astronomy. The present invention can also be used to reduce the effect of radiation damage in semiconductor detectors such as for example, germanium detectors. Additionally, the present invention can also be used to determine the time of arrival of the charge carriers at the collecting electrode 34. Furthermore, the present invention can also be employed, for example, in time-of-flight spectrometers.

Thus, the electrode configuration of the present invention can be readily formed onto the surface of semiconductor ionization substrates. The present invention also provides for single polarity charge carrier sensing ionization detectors including planar semiconductor detectors while achieving uniform electric field distributions within the ionization substrate or medium. As a result, the present invention achieves a large improvement in the energy resolution of semiconductor detectors, especially compound semiconductor detectors which can be operated at room temperature but currently have poor energy resolution because of the inefficient collection of the positive carriers. This invention also simplifies the fabrication of gas and liquid ionization detectors. Furthermore, the present invention significantly reduces position dependent signal amplitude variation problems within a surface parallel to the cathode and anode surfaces associated with the prior art.

While the best mode for carrying out the invention has been described in detail, those familiar with the art to which this invention relates will recognize various alternative designs and embodiments for practicing the invention as defined by the following claims.

What is claimed is:

1. An ionization detector electrode configuration comprising:
    a first central electrode disposed at a first surface of an ionization substrate, the first central electrode being adapted to receive a first voltage potential of a first polarity type, the first surface disposed opposing a second surface of the ionization substrate wherein the second surface has disposed thereat an opposing electrode adapted to receive a voltage potential of a second polarity type;
    a second central electrode disposed at the first surface of the ionization substrate, the second central electrode being adapted to receive a second voltage potential of the first polarity type, the first and second central electrodes being positioned at the first surface of the ionization substrate in a substantially interlaced and symmetrical pattern; and
    a boundary electrode disposed at the first surface of the ionization substrate surrounding the first and second central electrodes, the boundary electrode being adapted to receive a third voltage potential of the first polarity type such that signals generated by at least one charge carrier of the second polarity type moving within the ionization substrate between the first and second surfaces toward the first and second central electrodes and away from the opposing electrode are of substantially equal strength with respect to both the first and second central electrodes until the at least one charge carrier moves to within close proximity of the first and second central electrodes.

2. The electrode configuration as claimed in claim 1 wherein each of the first and second central electrodes includes parallel conductive strips and a conductive connector strip for commonly connecting its parallel conductive strips.

3. The electrode configuration as claimed in claim 2 wherein the conductive connector strip of each central electrode surrounds the parallel conductive strips of the other central electrode.

4. The electrode configuration as claimed in claim 1 wherein the boundary electrode completely surrounds the first and second central electrodes.

5. The electrode configuration as claimed in claim 1 wherein the ionization substrate is a semiconductor ionization substrate.

6. The electrode configuration as claimed in claim 1 wherein the ionization substrate is a compound semiconductor ionization substrate.

7. The electrode configuration as claimed in claim 1 wherein the ionization substrate is a solid state ionization substrate.

8. The electrode configuration as claimed in claim 1 wherein the ionization substrate is a gas ionization substrate.

9. The electrode configuration as claimed in claim 1 wherein the ionization substrate is a liquid ionization substrate.

10. The electrode configuration as claimed in claim 1 wherein the dimensions of the first and second central electrodes and the distance separating the first and second central electrodes is small compared to the distance between the first and second surfaces of the ionization substrate.

11. A method for single polarity charge detection, the method comprising the steps of:
    positioning a first central electrode at a first surface of an ionization substrate wherein the first surface is disposed opposing a second surface of the ionization substrate;
    positioning a second central electrode at the first surface of the ionization substrate in a substantially interlaced and symmetrical pattern with the first central electrode;
    positioning an opposing electrode at the second surface of the ionization substrate;
    positioning a boundary electrode at the first surface of the ionization substrate surrounding the first and second central electrodes such that signals generated by at least one charge carrier of a first polarity type moving within the ionization substrate between the first and second surfaces toward the first and second central electrodes and away from the opposing electrode are substantially of equal strength with respect to both of the first and second central electrodes until the at least one charge carrier of the first polarity type moves to within close proximity of the first and second central electrodes;
    applying a first voltage potential of a second polarity type to the first central electrode;
    applying a second voltage potential of the second polarity type to the second central electrode;
    applying a third voltage potential of the second polarity type to the boundary electrode;
    applying a voltage potential of the first polarity type to the opposing electrode; and
    measuring at both of the first and second electrodes the signals generated by the at least one charge carrier moving within the ionization substrate between the first and second surfaces.

12. The method as claimed in claim 11 wherein the steps of positioning the first and second central electrodes at the first surface of the ionization substrate in a substantially interlaced and symmetrical pattern further comprise the steps of:

positioning a plurality of parallel conductive strips and a conductive connector strip for commonly connecting the plurality of parallel conductive strips for each of the first and second central electrodes; and arranging the parallel conductive strips of the first central electrode parallel to the parallel conductive strips of the second central electrode and interlacing the parallel conductive strips of the first central electrode with the parallel conductive strips of the second central electrode such that adjacent parallel conductive strips of the first central electrode have a parallel conductive strip of the second central electrode disposed therebetween.

13. The method as claimed in claim 11 wherein the ionization substrate is a semiconductor ionization substrate.

14. The method as claimed in claim 11 wherein the ionization substrate is a compound semiconductor ionization substrate.

15. The method as claimed in claim 11 wherein the ionization substrate is a solid state ionization substrate.

16. The method as claimed in claim 11 wherein the ionization substrate is a gas ionization substrate.

17. The method as claimed in claim 11 wherein the ionization substrate is a liquid ionization substrate.

18. The method as claimed in claim 11 wherein the step of measuring the signals generated by the at least one charge carrier further comprises the steps of:

measuring at the first central electrode the signal generated by movement of the at least one charge carrier toward the first surface of the ionization substrate until the at least one charge carrier is collected at one of the first and second central electrodes;

measuring at the second central electrode the signal generated by movement of the at least one charge carrier toward the first surface of the ionization substrate until the at least one charge carrier is collected at one of the first and second central electrodes; and subtracting the signal measured at the second central electrode from the signal measured at the first central electrode such that the magnitude of the at least one charge carrier is quantitatively determined.

19. An ionization detector comprising:

an ionization substrate having a first surface and a second surface opposing the first surface;

a first central electrode disposed at the first surface;

an opposing electrode disposed at the second surface;

a second central electrode disposed at the first surface in a substantially interlaced and symmetrical pattern with the first central electrode;

a boundary electrode disposed at the first surface surrounding the first and second central electrodes such that signals generated by at least one charge carrier of a first polarity type moving within the ionization substrate between the first and second surfaces toward the first and second central electrodes and away from the opposing electrode are substantially of equal strength with respect to both of the first and second central electrodes until the at least one charge carrier of the first polarity type moves to within close proximity of the first and second central electrodes;

a first voltage potential circuit for applying a first voltage potential of a second polarity type to the first central electrode;

a second voltage potential circuit for applying a second voltage potential of the second polarity type to the second central electrode;

a third voltage potential circuit for applying a third voltage potential of the second polarity type to the boundary electrode;

a fourth voltage potential circuit for applying a voltage potential of the first polarity type to the opposing electrode; and a signal measurement circuit for measuring at both of the first and second central electrodes the signals generated by the at least one charge carrier moving within the ionization substrate between its first and second surfaces.

20. The ionization detector of claim 19 wherein each of the central electrodes includes parallel conductive strips and a conductive connector strip for commonly connecting its parallel conductive strips.

21. An ionization detector electrode configuration comprising:

a first central electrode adapted to receive a first voltage potential of a first polarity type;

a second central electrode disposed in a substantially interlaced and symmetrical pattern with the first central electrode and adapted to receive a second voltage potential of the first polarity type;

an opposing electrode spaced away from and opposing the first and second central electrodes and adapted to receive a voltage potential of a second polarity type;

a boundary electrode adapted to receive a third voltage potential of the first polarity type and surrounding the first and second central electrodes such that signals generated by at least one charge carrier of the first polarity type moving towards the first and second central electrodes and away from the opposing electrode are of substantially equal strength with respect to both the first and second central electrodes until the at least one charge carrier of the first polarity type moves to within close proximity of the first and second central electrodes, wherein the magnitude of the first voltage potential applied to the first central electrode is different from the magnitude of the second voltage potential applied to the second central electrode.

22. A method for single polarity charge detection in an ionization detector including a first central electrode; a second central electrode disposed in a substantially interlaced and symmetrical pattern with the first central electrode; an opposing electrode spaced away from and opposing the first and second central electrodes; and a boundary electrode surrounding the first and second central electrodes such that signals generated by at least one charge carrier of a first polarity type moving toward the first and second central electrodes and away from the opposing electrode are substantially of equal strength with respect to both the first and second central electrodes until the at least one charge carrier of the first polarity type moves to within close proximity of the first and second central electrodes, the method comprising the steps of:

applying a first voltage potential of a second polarity type to the first central electrode;

applying a second voltage potential of the second polarity type to the second central electrode;

applying a third voltage potential of the second polarity type to the boundary electrode;

applying a voltage potential of the first polarity type to the opposing electrode; and measuring at both of the first and second central electrodes the signals generated by the at least one moving charge carrier.

23. The method of claim 22 wherein the steps of applying the first and second voltage potentials to the first and second central electrodes comprise the steps of:

applying the first voltage potential of the second polarity type having a first magnitude to the first central electrode; and applying the second voltage potential of the second polarity type having a second magnitude to the second central electrode wherein the first magnitude of the first voltage potential is greater than the second magnitude of the second voltage potential.

24. The method as recited in claim 22 wherein the step of measuring the signals generated by the at least one charge carrier further comprises the steps of:

measuring at the first central electrode the signal generated by movement of the at least one charge carrier until the at least one charge carrier contacts the first central electrode;

measuring at the second central electrode the signal generated by movement of the at least one charge carrier until the at least one charge carrier contacts the first central electrode; and determining the magnitude of the at least one charge carrier by subtracting the signal measured at the second central electrode from the signal measured at the first central electrode.

25. An ionization detector comprising:

a first central electrode;

a second central electrode disposed in a substantially interlaced and symmetrical pattern with the first central electrode;

an opposing electrode spaced away from and opposing the first and second central electrodes;

a boundary electrode surrounding the first and second central electrodes such that signals generated by at least one charge carrier of a first polarity type moving toward the first and second central electrodes and away from the opposing electrode are substantially of equal strength with respect to both of the first and second central electrodes until the at least one charge carrier of the first polarity type moves to within close proximity of the first and second electrodes;

a first voltage potential circuit for applying a first voltage potential of a second polarity type to the first central electrode;

a second voltage potential circuit for applying a second voltage potential of the second polarity type to the second central electrode;

a third voltage potential circuit for applying a third voltage potential of the second polarity type to the boundary electrode;

a fourth voltage potential circuit for applying a voltage potential of the first polarity type to the opposing electrode; and a signal measurement circuit measuring at both of the first and second central electrodes the signals generated by the at least one charge carrier moving toward the first and second central electrodes and away from the opposing electrode.

\* \* \* \* \*